(12) United States Patent
Pham

(10) Patent No.: US 7,222,701 B2
(45) Date of Patent: May 29, 2007

(54) BACKING PLATE WITH FRICTION MATERIAL RETENTION MEMBERS AND METHOD AND APPARATUS FOR MANUFACTURING SAME

(75) Inventor: Nghi Pham, Concord (CA)

(73) Assignee: Capital Tool & Design Limited, Concord (CA)

( * ) Notice: Subject to any disclaimer, the term of this patent is extended or adjusted under 35 U.S.C. 154(b) by 0 days.

(21) Appl. No.: 10/453,179

(22) Filed: Jun. 2, 2003

(65) Prior Publication Data

US 2004/0238295 A1   Dec. 2, 2004

(51) Int. Cl.
*F16D 69/04* (2006.01)
(52) U.S. Cl. .................. 188/250 G; 188/73.1
(58) Field of Classification Search ............ 188/250 G, 188/250 B, 73.1, 234, 261, 73.2, 250 R, 188/250 A; 192/107 R, 107 M, 70.13; 428/2.23; 427/290, 356
See application file for complete search history.

(56) References Cited

U.S. PATENT DOCUMENTS

| | | | |
|---|---|---|---|
| 995,067 A | 6/1911 | Jones | |
| 1,336,752 A | 4/1920 | Muller | |
| 1,781,074 A | 11/1930 | Norton | |
| 1,875,645 A | 9/1932 | Norton | |
| 1,950,260 A | 3/1934 | Nelson | 188/249 |
| 2,490,548 A | 12/1949 | Schultz | 29/189 |
| 2,879,866 A | 3/1959 | Newell | 188/234 |
| 4,005,991 A | 2/1977 | Uebayasi et al. | 29/196.2 |
| 4,023,613 A | 5/1977 | Uebayasi et al. | 164/100 |
| 4,154,900 A | 5/1979 | Kaku et al. | 428/554 |
| 4,560,607 A | 12/1985 | Sumner | 428/141 |
| 4,569,424 A | 2/1986 | Taylor, Jr. | 188/250 G |
| 4,640,390 A | 2/1987 | Saumweber et al. | 188/73.37 |
| 4,799,579 A | 1/1989 | Myers et al. | 192/107 M |
| 5,079,825 A | 1/1992 | Matsui et al. | 29/520 |
| 5,141,083 A | 8/1992 | Burgoon | 188/73.1 |
| 5,285,873 A | 2/1994 | Arbesman | 188/73.1 |
| 5,355,986 A | 10/1994 | Biswas | 192/107 R |
| 5,376,410 A | 12/1994 | MacKelvie | 427/290 |
| RE36,313 E | 9/1999 | Kahr | 188/250 R |

(Continued)

FOREIGN PATENT DOCUMENTS

CA      311275      5/1931

(Continued)

OTHER PUBLICATIONS

ThomasNet Industrial News Room; Feintool Introduces FeinGrip Patented Brake Pad Attachment System, Oct. 1, 2002.*

(Continued)

*Primary Examiner*—Thomas Williams
(74) *Attorney, Agent, or Firm*—Greenberg Traurig LLP; Alan Tenenbaum

(57) ABSTRACT

A backing plate for a friction assembly includes a body having a first surface and a second surface and a thickness defined therebetween. One or more retention members are provided on the first surface for engaging a friction material mounted thereon. Each retention member has an extruded protrusion and an groove. The extruded protrusion has a generally constant width and a free curved distal end. The groove has a bottom wall having an inclined section and a flat section.

34 Claims, 12 Drawing Sheets

U.S. PATENT DOCUMENTS

| | | | |
|---|---|---|---|
| 6,279,222 B1 | 8/2001 | Bunker et al. | 29/527.5 |
| 6,327,887 B1 | 12/2001 | Kunz et al. | 72/316 |
| 6,367,600 B1 | 4/2002 | Arbesman | 188/250 |
| 6,431,331 B1 | 8/2002 | Arbesman | 188/250 G |
| 6,464,047 B1 | 10/2002 | Arbesman | 188/250 G |
| 2004/0016608 A1* | 1/2004 | Gutowski | 188/73.1 |
| 2004/0040796 A1* | 3/2004 | Pham | 188/73.37 |
| 2004/0140165 A1* | 7/2004 | Pham | 188/218 XL |

FOREIGN PATENT DOCUMENTS

| | | |
|---|---|---|
| CA | 511384 | 3/1955 |
| CA | 618550 | 4/1961 |
| CA | 1330521 | 7/1994 |
| CA | 1337622 | 11/1995 |
| CA | 2127339 | 1/1996 |
| CA | 2318732 | 6/1999 |
| CA | 2262214 | 8/2000 |
| CA | 2299110 | 8/2000 |
| CA | 2347314 A1 * | 11/2002 |
| DE | 758303 | 7/1953 |
| DE | 2242877 | 3/1974 |
| DE | 2423870 | 12/1974 |
| DE | 2427694 | 12/1975 |
| EP | 084591 | 8/1983 |
| EP | 163030 | 12/1985 |
| EP | 267561 | 7/1987 |
| EP | 731288 | 9/1996 |
| FR | 1589392 | 5/1981 |
| GB | 319856 | 10/1929 |
| GB | 694905 | 7/1953 |
| GB | 921146 | 3/1963 |
| GB | 1160503 | 8/1969 |
| GB | 2071795 | 9/1981 |
| GB | 2245667 | 1/1992 |
| GB | 2299382 | 10/1996 |
| GB | 2303891 | 5/1997 |
| IT | 687714 | 3/1965 |
| JP | 55139534 | 10/1980 |
| WO | 0049308 | 8/2000 |

OTHER PUBLICATIONS

Feintool product literature contained in Canadian Protest, (possibly dated around Oct. 2002).

Protest filed in Canadian patent application 2,470,001, dated Jul. 11, 2005.

* cited by examiner

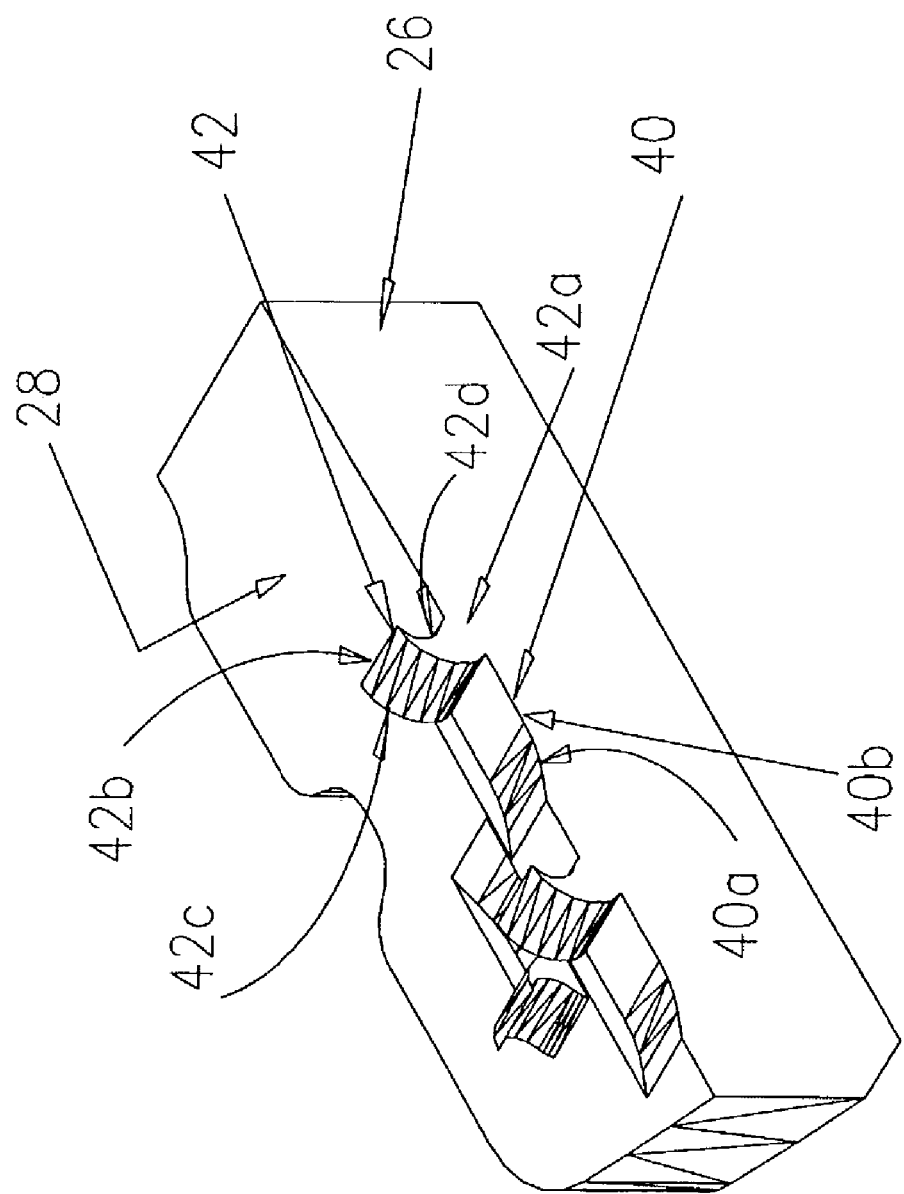

BACKING PLATE WITH FRICTION MATERIAL RETENTION MEMBERS AND METHOD AND APPARATUS FOR MANUFACTURING SAME

FIELD OF THE INVENTION

This invention relates to friction assemblies suitably used with brakes on vehicles, and more particularly to a backing plate and method and apparatus for manufacturing the same.

BACKGROUND OF THE INVENTION

A friction assembly is a replaceable element in a brake system. In a disk brake, a friction assembly bears against a rotating disc called a rotor. The friction assembly comprises a backing plate to which a friction pad is adhered. The friction pad alone contacts the rotor of the disc brake to provide the stopping frictional force. Significant forces are involved in applying the pad to the rotor, and due to the relative movement during engagement, extreme heat can be generated, and the temperature of the friction material and/or backing plate may reach up to about 1200° F. Moreover, depending upon the size and/or the payload carried by certain vehicles, the friction assembly may also be subject to significant pressure and vibration when stopping the vehicle. It is very important that the backing plate be resistant to bending or breaking due to high pressure, temperature and vibration when stopping vehicles.

Typically, backing plates are modified to include bores, cavities, gouges or protuberances to receive and engage the friction material. These modifications generally improve engagement with a friction material. However, the costs associated with manufacturing backing plates with such modifications can often be prohibitive. It is therefore desirable to provide a backing plate having improved engagement with a friction material and that can be manufactured without undue cost.

SUMMARY OF THE INVENTION

The present invention uses one or more retention members formed on a surface of a backing plate for engaging a friction material. Each retention member comprises an extruded protrusion and an associated groove having a bottom that includes a flat portion and an angled wall. By associated, it is meant that each protrusion is adjacent to, or in close proximity with, the groove. As further described below, each protrusion is formed from material extruded from the backing plate during preparation of each groove.

In accordance with an embodiment of the invention, there is provided a backing plate for a friction assembly. The backing plate comprises a body and one or more retention members. The body has a first surface for receiving a friction material thereon and a second surface opposed to the first surface, the space between the first and second surfaces comprising the thickness of the backing plate. The one or more retention members are defined on the first surface. Each retention member has a protrusion extending outwardly away from the first surface of the body, the protrusion having a proximal end connected to the first surface and a free distal end. The protrusion has a generally constant width from the proximal end to the distal end. There is a groove associated with the protrusion, defined in the first surface of the body, and the groove extends from a position on the first surface of the body to about the proximal end of the protrusion, the groove having a bottom wall having an inclined section extending at an angle relative to the first surface and a flat section generally parallel to the first surface. The groove further has a generally constant width that generally corresponds to the width of the protrusion.

In accordance with another aspect of the invention, there is provided a friction assembly comprising the backing plate and a friction material mounted on the backing plate with the friction material engaged with the at least one retention member present on the first surface of the backing plate.

In accordance with another aspect of the invention, there is provided a method for making a backing plate for a friction assembly. The method comprises the steps of: pressing, against a first surface of a backing plate material, an extrusion tool having an extrusion edge and a curved shoulder above the extrusion edge; guiding the extrusion tool at an angle towards a second surface of the backing plate material opposite to the first surface for a first predetermined distance, and then generally parallel to the first surface of the backing plate material for a second predetermined distance; and extruding, while guiding the extrusion tool, a portion of the backing plate material to form a retention member which comprises a protrusion having a curved end formed along the curved shoulder of the extrusion tool, and a groove associated with the protrusion and having a bottom wall that has an inclined section and a flat section.

In accordance with another aspect of the invention, there is provided a method for forming a backing plate for a friction assembly. The method comprises the steps of: modifying a surface of a backing plate material to form one or more retention members on the surface for enhancing retention of a friction material mounted on the backing plate when the friction assembly is in use; and blanking a backing plate from the backing plate material after performing the modifying step.

In accordance with another aspect of the invention, there is provided a backing plate manufacturing apparatus for manufacturing a backing plate for a friction assembly. The backing plate manufacturing apparatus comprises an extrusion station for forming one or more retention members on a backing plate material. The backing plate material has a first surface for receiving a friction material, and a second surface opposite to the first surface, the distance between the first and second surfaces comprising the thickness of the material. The extrusion station has multiple extrusion tools, each having one or more extrusion edges and corresponding curved shoulders above the extrusion edges; and a mechanism for moving the extrusion tools such that each extrusion edge moves from a position on the first surface towards the second surface at an angle for a first predetermined distance, and then generally parallel to the first surface for a second predetermined distance.

In accordance with another aspect of the invention, there is provided an extrusion tool for extruding a portion of a backing plate material for forming a retention member on a surface of the backing plate. The extrusion tool comprises an extrusion edge for pushing a portion of the backing plate material; a curved shoulder provided continuously from the extrusion edge to form a curved protrusion end; and an oblong hole defined in the extrusion tool, the oblong hole providing upper and lower walls inclined at an angle for moving the extrusion tool at the angle.

BRIEF DESCRIPTION OF THE DRAWINGS

For a better understanding of the present invention, and to show more clearly how it may be carried into effect, reference will now be made by way of example to the accompanying drawings. The drawings show preferred embodiments of the present invention, in which:

FIG. 4A is an enlarged perspective view of a retention member on the backing plate of FIG. 2;

DETAILED DESCRIPTION OF THE PREFERRED EMBODIMENTS

Figure 1:
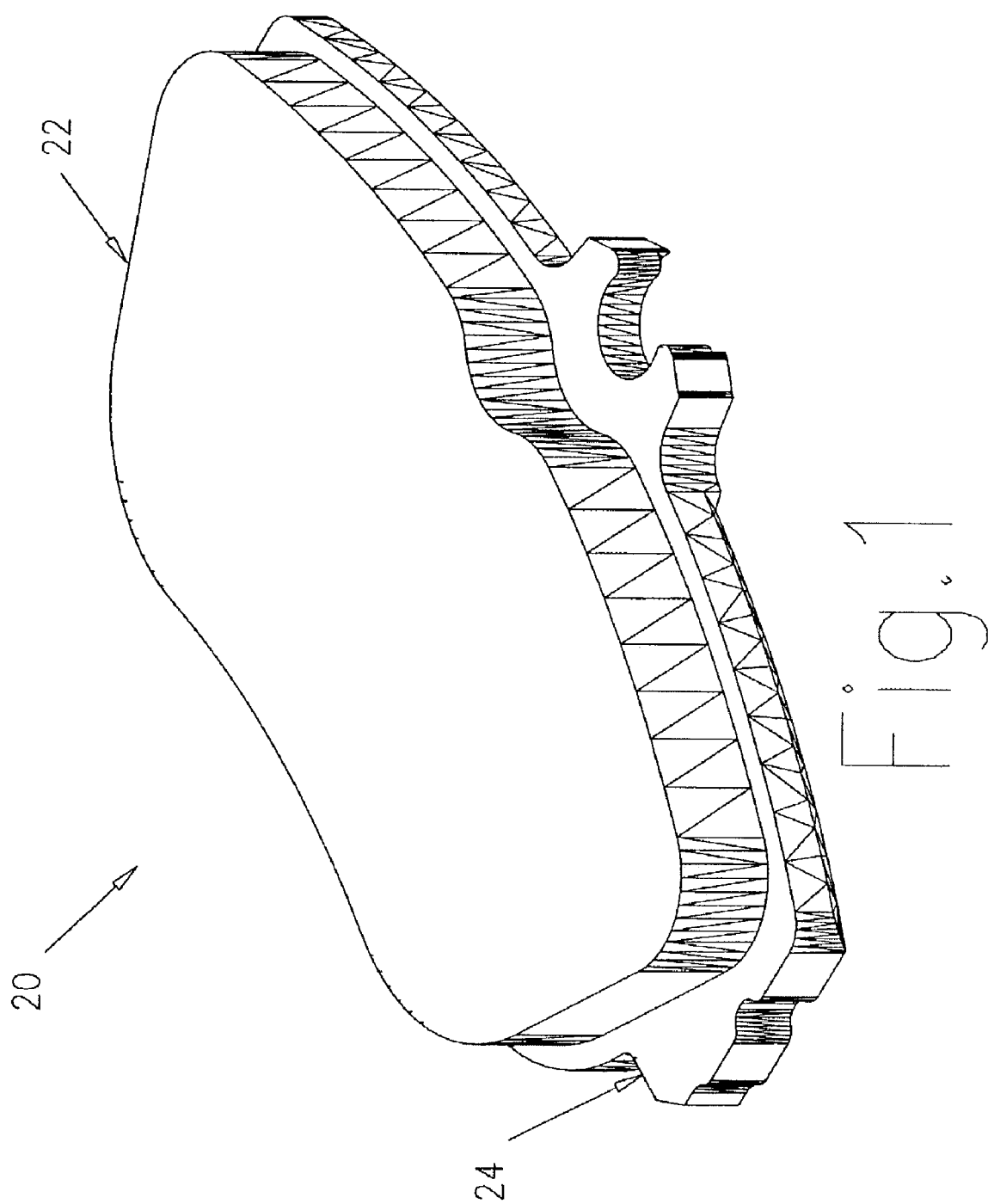
FIG. 1 is a perspective view of a friction assembly in accordance with an embodiment of the present invention.

An embodiment of the present invention provides a backing plate with one or more retention members for engaging a friction material. Each retention member comprises an extruded protrusion and an associated groove adjacent to the protrusion. The groove has an elongated shape and a generally constant width. It has a bottom wall having an inclined section and a generally flat section. The protrusion has a generally constant width from a proximal end to a free distal end. The width of the protrusion generally corresponds to the width of the adjacent groove. The protrusion extends outwardly away from the surface of the backing plate, and has a curved shape formed by the shape of an extruding tool.

The backing plate of this embodiment is intended for use with a disc brake. However, the present invention may be applied to different types of brakes with or without suitable modifications.

The invention will now be described with reference to the Figures, wherein like reference numerals indicate like elements. It is to be noted that the Figures are drawn to more clearly show certain structural aspects of the invention, and therefore may not be to scale.

FIG. 1 generally shows a friction assembly 20 in accordance with an embodiment of the present invention. Friction assembly 20 includes a friction material 22 and a backing plate 24.

Friction material 22 can be any suitable material which provides braking properties. In one embodiment, the friction material is made of phenolic resin with iron powder, steel or carbon fibers, and/or carbon powder. Friction material 22 is mounted on backing plate 24, e.g., molded in a known manner to backing plate 24.

Backing plate 24 is formed of metal, a metal composite or any other material that is suitable for the intended use of the friction assembly 20 and that may be processed in accordance with the method described below. Backing plate 24 is of a conventional shape and thickness, and may include apertures and other structural elements known in the art to permit the backing plate to be incorporated within a brake assembly (not shown).

Referring to FIGS. 2–4B, backing plate 24 is further described in detail.

Backing plate 24 has a body 26 with a planar top or first surface 28 and an opposing planar bottom or second surface 30. The space between the first 28 and second 30 surfaces comprising the thickness of the backing plate 24. First surface 28 includes multiple retention members 32 for engaging friction material 22 once the friction material has been disposed on first surface 28.

Figure 3:
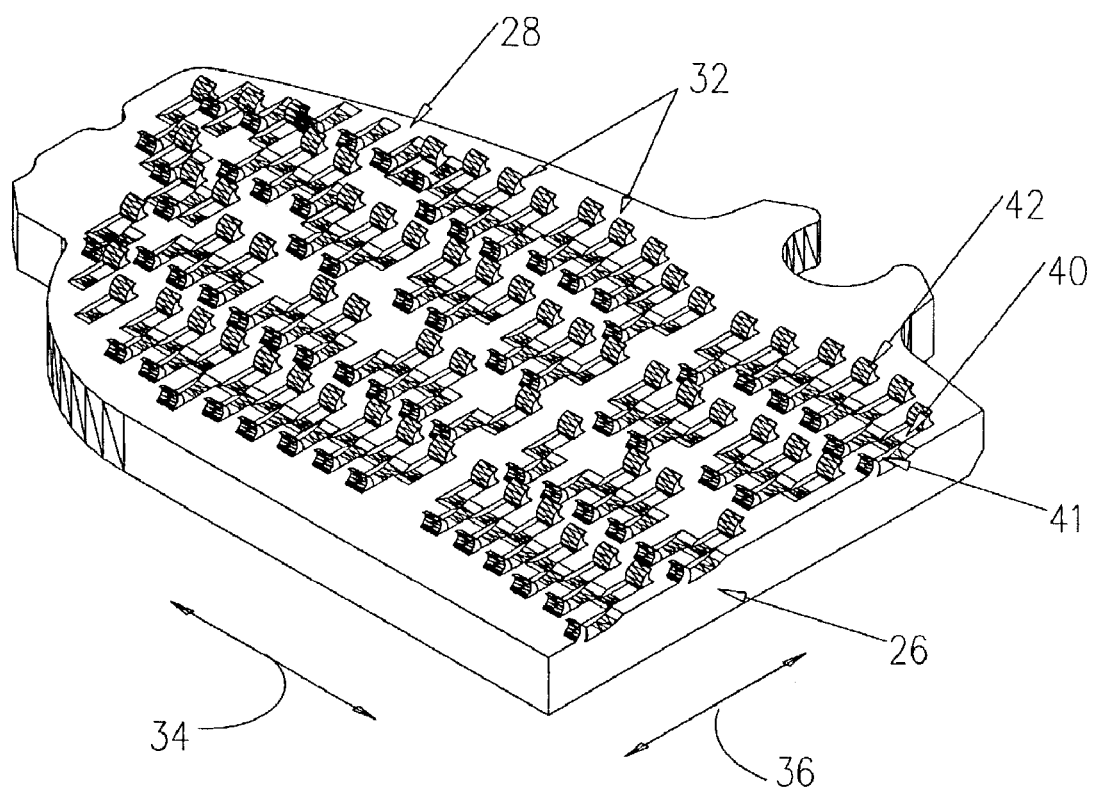
FIG. 3 shows a cross-section of the backing plate of FIG. 2 along line 3—3.

As shown in FIG. 3, each retention member 32 comprises a groove 40 and a protrusion 42 adjacent to the groove 40. Groove 40 is defined in first surface 28 of plate body 26 adjacent to associated protrusion 42. Protrusion 42 protrudes outwardly from the first surface 28 of plate body 26.

Figure 4B:
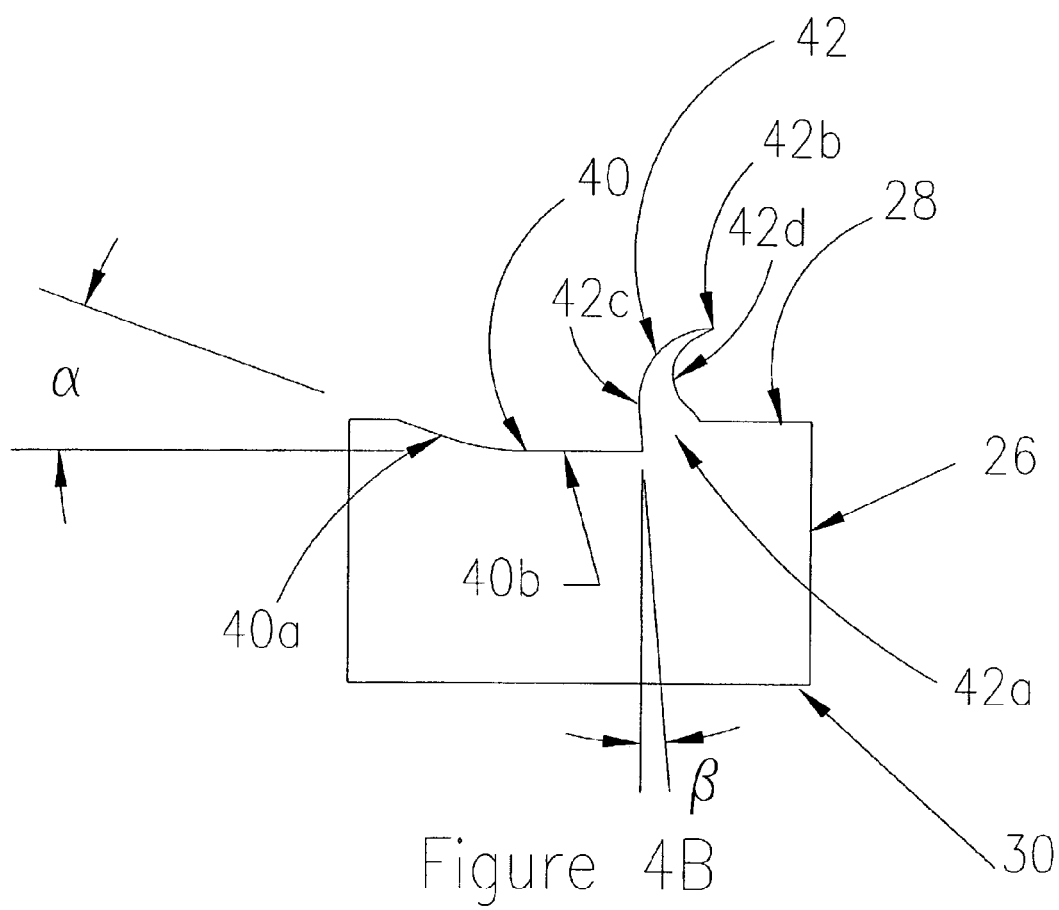
FIG. 4B is a side view of the retention member for the backing plate of FIG. 4A.

Protruding portion 42 is formed by an extrusion process, as further described below. As best seen in FIGS. 4A and 4B, extruded portions 42 extend outwardly away from first surface 28, i.e., upwardly above first surface 28 in FIG. 4B. Protrusion 42 has a proximal end 42a and a free distal end 42b. Protrusion 42 has a generally constant width from the proximal end 42a to the distal end 42b. Protrusion 42 typically has a width in the range of about 0.08 inches to about 0.10 inches.

Protrusion 42 is thicker at the proximal end 42a. The thickness diminishes towards free distal end 42b. The thickness at proximal end 42a is typically in the range of about 0.03 inches to about 0.06 inches.

Protrusion 42 may be curved or rounded along its length from proximal end 42a to free distal end 42b in a direction away from neighbouring groove 40. This curvature forms a longer convex wall 42c and a shorter concave wall 42d between proximal end 42a and distal end 42b. Longer convex wall 42c starts from an end of the bottom wall of adjacent groove 40 at an angle β with respect to a plane perpendicular to first surface 28 of body 26. The angle β is typically in the range of about 5 degrees to 10 degrees. Shorter concave wall 42d starts from a point on first surface 28 of plate body 26 near the end of the bottom wall of associated groove 40. Thus, protrusion 42 presents in general a distorted semi-triangular cross-section with free end 42b, convex side wall 42c, and concave side wall 42d. The curved free end 42b is in a linear relationship with the body of extruded portion 42 and neighbouring groove 40, i.e., extruded portion 42 is not rotated or twisted.

Extruded portions 42 are an integral part of backing plate 24 and are formed from the material displaced from adjacent grooves 40 during the extrusion process. Proximal end 42a is integrally connected to first surface 28 of the plate body 26 such that the bottom end of convex wall 42c merges into the end of the bottom wall of associated groove 40 and the bottom end of the concave wall 42d merges into first surface 28.

Extruded portion 42 can be any suitable height so long as the extruded portion can adequately adhere to or retain the friction material 22 and withstand the force and vibrations applied during breaking. The extruded portion preferably has a height of between about 0.03–0.075 inches above first surface 28 for backing plates for regular passenger vehicles. For larger vehicles, it is typically desirable to have higher extruded portions 42, for example, about 0.100 inch.

Groove 40 has an elongated shape with a generally constant width. The width generally corresponds to the width of associated protrusion 42. Groove 40 has a bottom wall that comprises an inclined section 40a and a flat section 40b along its length. Flat section 40b is generally parallel to first surface 28. Inclined section 40a starts from a point on first surface 28 and inclines inward of the plate body 26 at an angle a from a plane parallel to the first surface 28 towards an end of flat section 40b. Although the angle a is typically between about 10 to 20 degrees, α can be any suitable degree. This angle is more clearly shown in FIG. 4B, and is the angle a formed between a plane parallel to the first surface 28 and the inclined section 40a. The other end of flat section 40b is located at the proximal end 42a of the protrusion 42 as described above. It is typical to form inclined section 40a and the flat section 40b in a ratio of lengths between 1 to 1 and 2 to 1. The dimensions of the grooves are not critical. A groove will typically have a depth in the range of about 0.01 inches to about 0.03 inches, a width in the range of about 0.08 inches to about 0.10 inches, and a total length in the range of about 0.12 inches to about 0.22 inches.

When friction assembly 20 is in use, it will receive a major shear force in a predetermined direction. For backing plate 24 shown in FIGS. 2 and 3, the predetermined direction in which the major shear force occurs is along the length of backing plate 24 or a force receiving axis 34, as indicated in FIG. 3. It is preferable that each retention member 32 is provided such that the groove 40 extends generally along the width of backing plate 24 or an axis 36 perpendicular to force receiving axis 34. This orientation of retention members 32 allows the use of a smaller manufacturing apparatus to create retention members 32 in a group along perpendicular axis 36 as described below, compared to a conventional apparatus which moves surface modifying blades a longer distance along the force receiving direction of a backing plate. However, in different embodiments, retention members 32 may be oriented differently.

Retention members 32 are arranged on first surface 28 of backing plate 24 in a density and pattern that provides desired retention of friction material 22 while maintaining structural integrity of backing plate 24. Retention members 32 may be distributed randomly over the first surface 28. For the purposes of efficient manufacturing, it is preferable to arrange the retention members 32 to form multiple groups oriented along the perpendicular axis 36, as shown in FIG. 3. Each group may have one or more retention members 32. Different groups may have different numbers of retention members 32. In the direction of the friction force receiving axis 34, there is no regular pattern of rows formed by retention members 32. In the embodiment shown in the Figures, neighbouring groups are closely provided next to each other in a column format, and retention members 32 within a single column are spaced apart from each other. Alternative embodiments of the invention may nevertheless have the retention members arranged in a different manner than as illustrated in the Figures.

Figure 2:
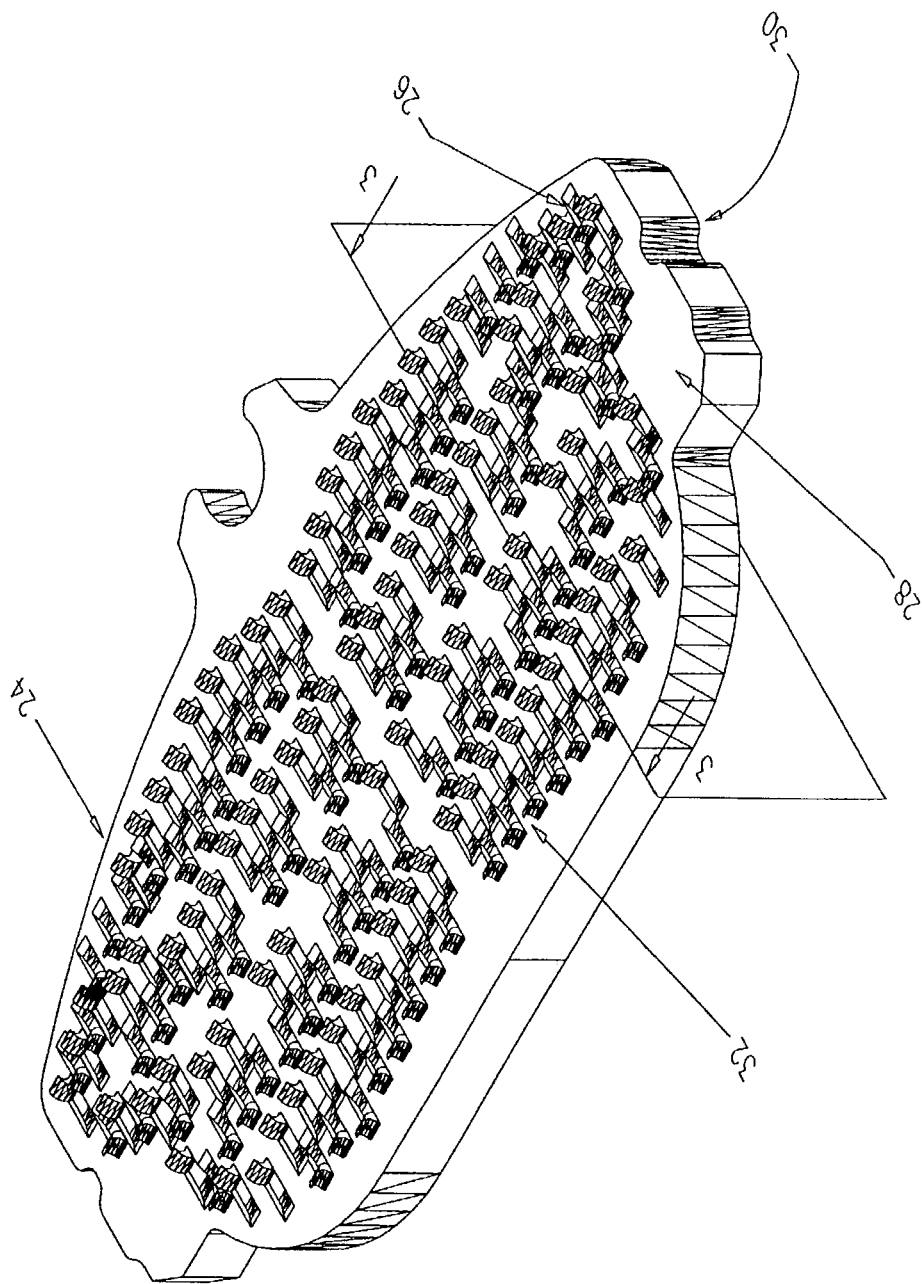
FIG. 2 is a perspective view of a backing plate for the friction assembly of FIG. 1.

Extruded protrusions 42 are typically curved in opposite directions in alternating neighbouring groups as shown in FIGS. 2 and 3.

Typically, backing plates are manufactured using oils for smooth machine handling. These oils need to be washed off prior to mounting friction materials on to the backing plates for secure attachment of the friction materials. According to certain conventional techniques, protrusions or burrs are cut or scored out from a plate surface and thus are fragile. Backing plates having such burrs require manual washing of each plate to avoid breakage of the fragile burrs. However, manual washing often does not remove oils sufficiently. Thus, it is typically necessary to use an adhesive on such backing plates to improve retention of the friction materials. Also, fragile burrs require careful handling of backing plates prior to attachment of the friction materials, including the use of cushioning materials between plates during transportation or storage.

By contrast, retention members 32 according to the embodiment shown in FIGS. 2 and 3 have wide and strong protrusions 42. Thus, the backing plate 24 can be washed efficiently using a tumbling washing machine. Machine washing typically results in cleaner surfaces than manual washing. Thus, the need for use of an adhesive on backing plate surface 28 can be reduced or even eliminated for certain applications, such as for a brake assembly for a standard passenger car. Also, these strong protrusions 42 allow easy handling of backing plates 24 during transportation and storage.

Figure 5:
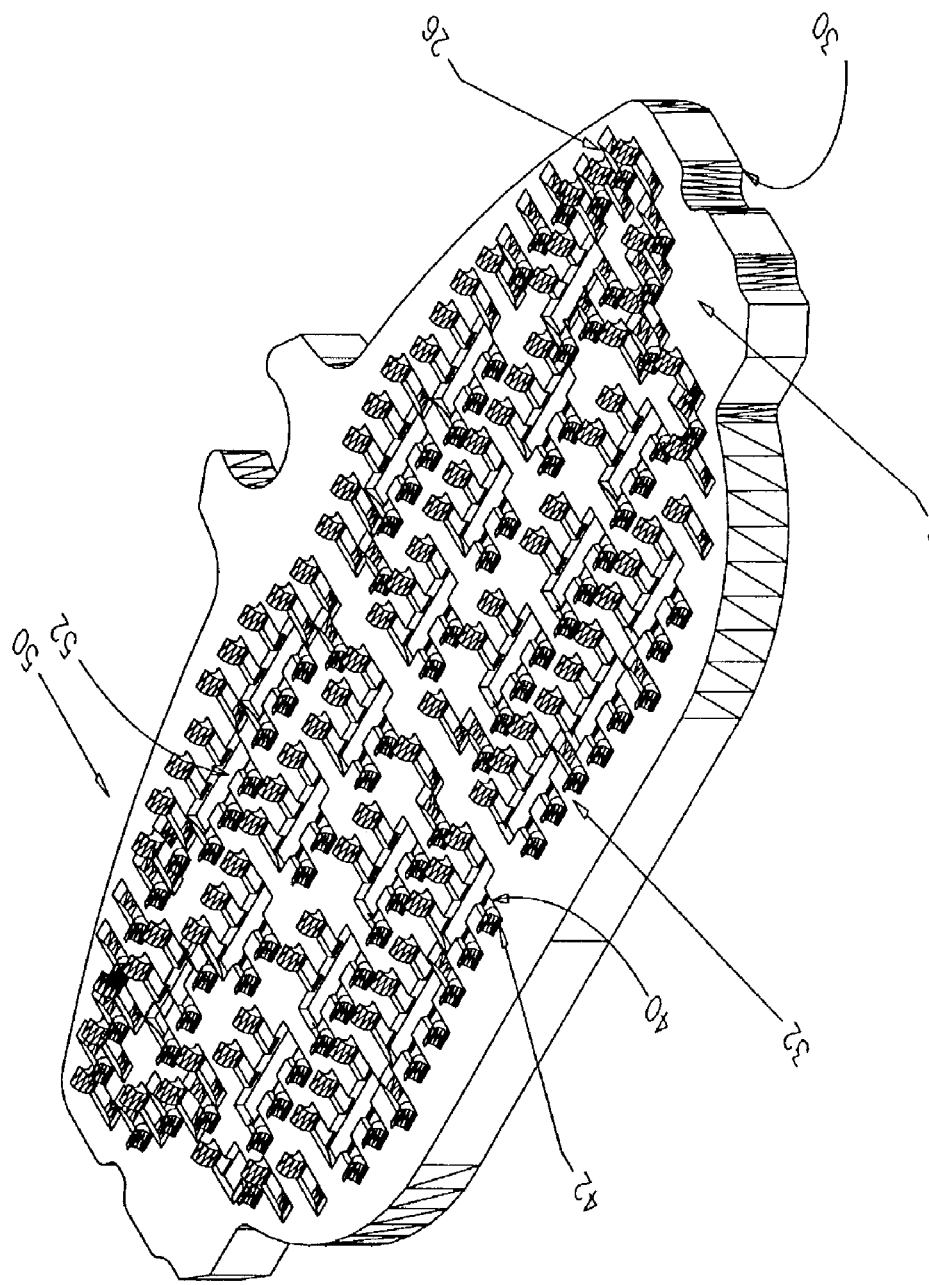
FIG. 5 is a perspective view of a backing plate according to another embodiment of the invention.

FIG. 5 shows a backing plate 50 in accordance with another embodiment of the invention. Backing plate 50 is similar to backing plate 24 shown in FIGS. 2 and 3, and similar elements are shown with the same reference numerals. In addition to retention members 32, backing plate 50 is provided with multiple impressions 52 to further increase the retention surface area of the backing plate when a friction material is mounted, and improve the retention strength of the friction material against shear forces during use.

Impressions 52 are provided over grooves 40 bridging several retention members 42. Impressions 52 may bridge any number of retention members 42 or may be provided on a single retention member 42. It is not necessary that all retention members 42 are provided with impressions 52. Also, one or more impressions 52 may be provided in an area on the first surface 28 where no retention member is formed.

Impressions 52 shown in FIG. 5 are generally uniform and each has an elongated groove-like shape with a smooth flat bottom. However, different impressions 52 may have different shapes that are suitable to provide additional surfaces that may contribute to the retention of the friction member. Each impression 52 is preferably deeper than groove 40 over which impression 52 is formed. The bottom of impression 52 may be flat, smoothly curved or formed with multiple surfaces.

Retention members 32 are formed using an extrusion technique. The retention members 32 may be formed either on a plate blanked in the general shape of the desired backing plate, or on a strip of incoming plate material which is being fed into a blanking die.

The creation of retention members 32 on a blanked plate tends to change the dimensions of the plate, especially in the direction of the formation of grooves 40. For backing plate 24 shown in FIGS. 2 and 3, precise dimensions are typically critical in the direction of the force receiving axis 34 and around the two ends to complete a brake assembly. On the other hand, some degree of dimensional variation is typically acceptable in the direction of perpendicular axis 36. As grooves 40 are to be formed generally along perpendicular axis 36 in this embodiment, retention members 32 can be formed on a blanked plate without necessitating post-adjustment of the dimensions of the plate 24.

The creation of impressions 52 shown in FIG. 5 often causes expansion of the plate 50 in several directions. Accordingly, it is advantageous to form retention members 32 on a strip of plate material and then to blank backing plates out of the strip. By blanking after the surface modification, backing plates 50 of precise dimensions can be efficiently manufactured.

The manufacturing process used to prepare the claimed backing plate will now be described with reference to FIGS. 6–10.

Figure 6:
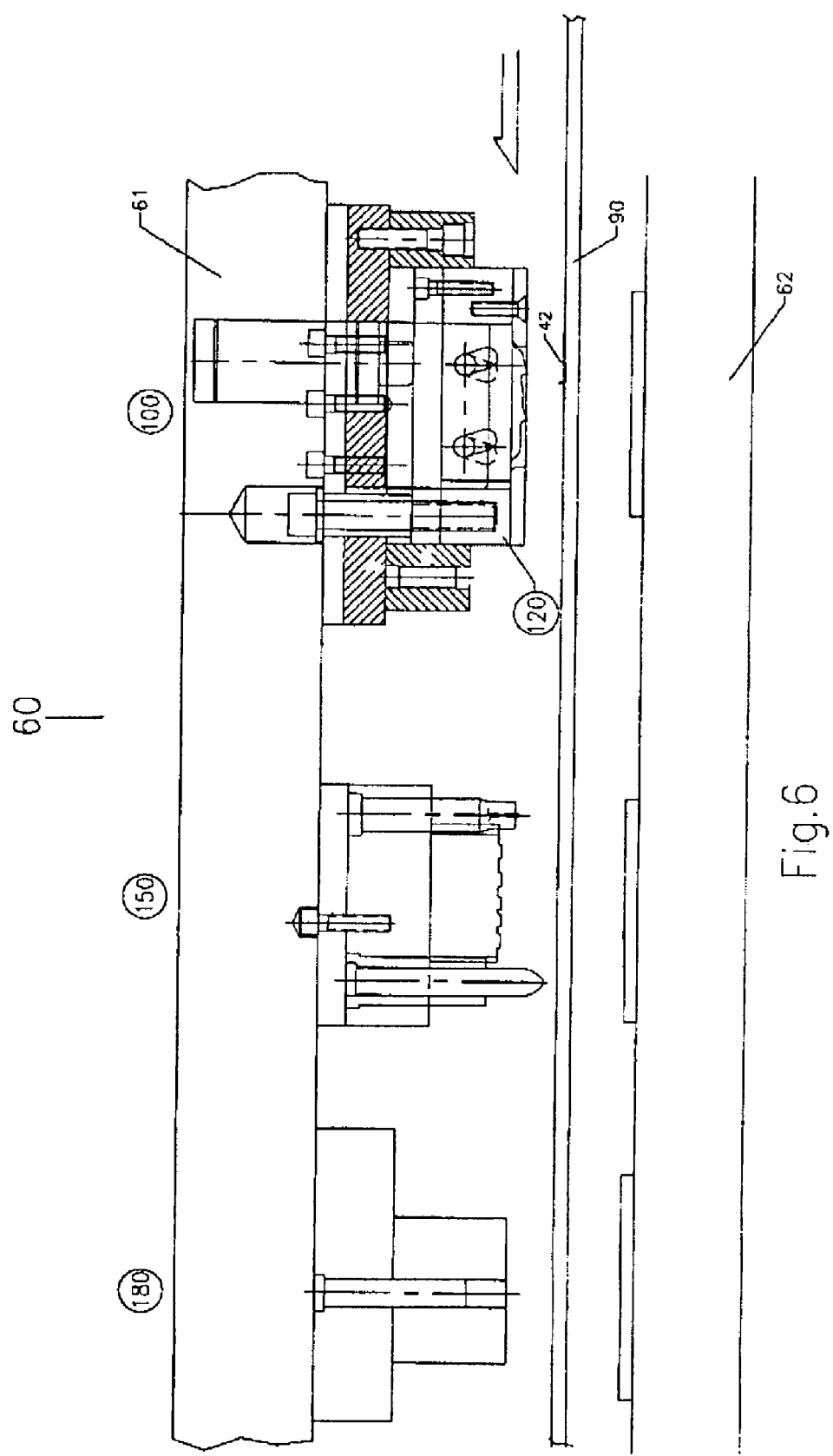
FIG. 6 is a schematic cross-sectional side view of a backing plate manufacturing apparatus in accordance with an embodiment of the present invention.

FIG. 6 illustrates a general view of a backing plate manufacturing apparatus 60 in accordance with an embodiment of the invention. Backing plate manufacturing apparatus 60 can be suitably used to manufacture backing plates 50 having retention members 32 and impressions 52 on a strip of plate material 90.

Backing plate manufacturing apparatus 60 comprises an extrusion station 100, an impression station 150 and a blanking station 180. When all stations are to be used, it is advantageous to provide these stations in this order to obtain backing plates of precise dimensions. When impressions 52 are not required, backing plate manufacturing apparatus 60 does not need to include the impression station 150. In that case, in place of a strip of plate material 90, blanked plates may be fed into the extrusion station 100, and blanking station 180 can be omitted from backing plate manufacturing apparatus 60.

Backing plate manufacturing apparatus 60 has a top die shoe 61 and a bottom die shoe 62. Top die shoe 61 is moved downwardly and upwardly by a press (not shown). Top and bottom die shoes 61, 62 are commonly used by extrusion station 100, impression station 150 and blanking station 180. Thus, synchronized operation of these stations 100, 150 and 180 can be achieved. Instead of using common die shoes, the stations 100, 150 and 180 may use separate die shoes and/or presses and a separate synchronizing mechanism may be provided. In other embodiments, each station may be operated independently from the other stations.

Figure 7A:
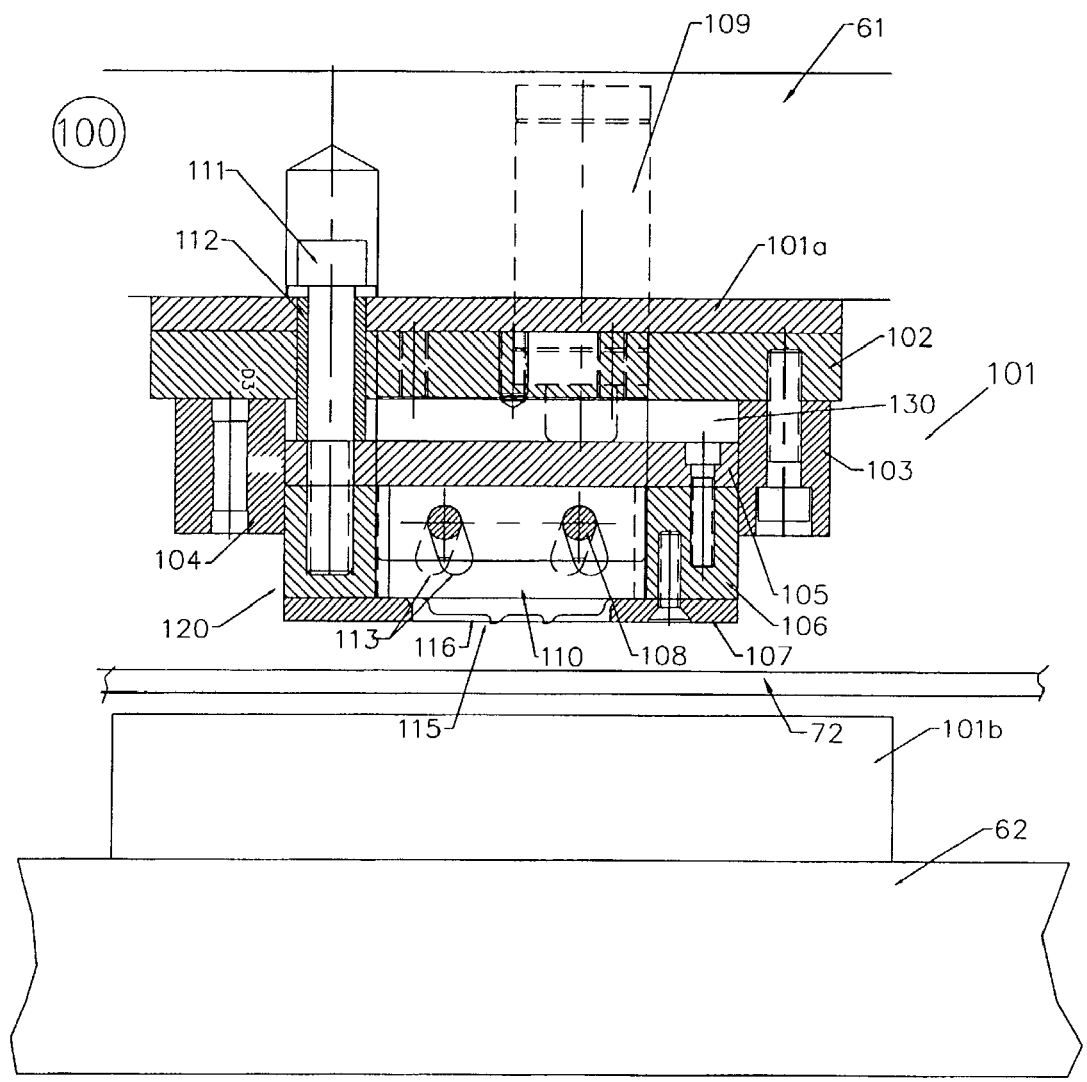
FIG. 7A is a schematic cross-sectional section view of an extrusion station for forming retention members at a die open position.
Figure 7B:
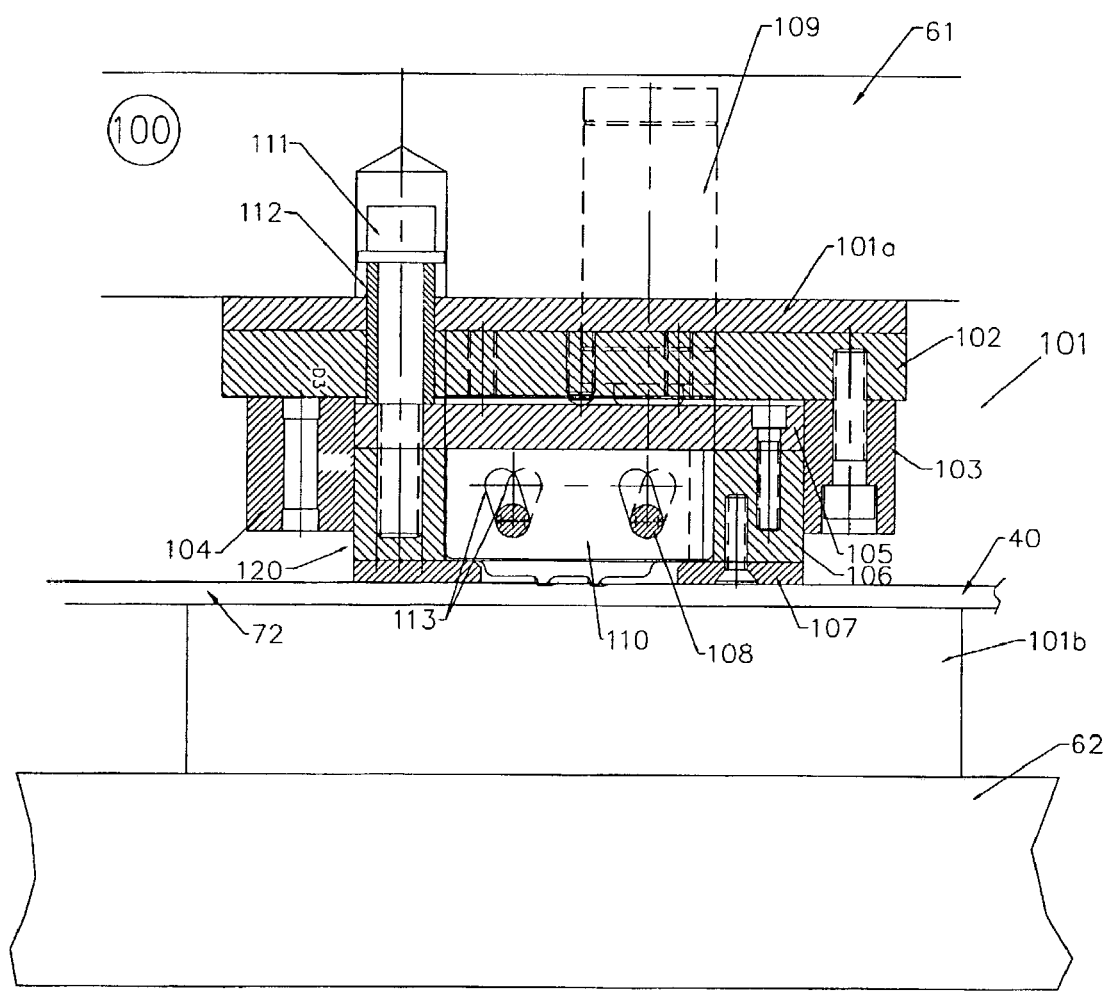
FIG. 7B is a schematic cross-sectional view of the extrusion station at a die close position.

Referring now to FIGS. 7A and 7B, extrusion station 100 is described further. Extrusion station 100 comprises a press die 101 having an upper die 101a and a bottom die 101b. Upper die 101a includes upper die shoe 61. Upper die 101a holds extrusion tool assembly 120.

Extrusion tool assembly 120 includes a set of extrusion tools 110. It is preferable that the set of extrusion tools 110 is arranged such that a single stroke of the press can form on the plate material all desired retention members 42 for a backing plate.

Each extrusion tool 110 can be made shorter or longer, resulting in a correspondingly smaller or larger extrusion tool assembly 120. As described above, in this embodiment, each extrusion tool 110 forms a relatively short group of retention members 32, and accordingly, a small extrusion tool assembly 120 can be used. Advantageously, when an extrusion edge is broken or warn out, extrusion tool 110 can be exchanged easily as it is relatively small and inexpensive.

Referring to FIG. 7A, extrusion tool assembly 120 has top cover 105, housing 106 and bottom cover 107. The set of extrusion tools 110 is accommodated in housing 106 and supported by top cover 105 from the upper end and by bottom cover 107 from the lower end. Housing 106 is wider than extrusion tools 110 such that extrusion tools 110 can move horizontally within housing 106. Bottom cover 107 has a rim defining a central hole. The rim holds each extrusion tool 110 by its shoulders 118 while the central hole allows extrusion edges 115 to be extended below bottom cover 107. Further, extrusion tool assembly 120 has two pins 108 which are provided through oblong holes 113 of extrusion tools 110. Pins 108 are movable with base 102. Thus, in the extrusion tool assembly 120, there are several extrusion tools 110 moving inside of housing 106 in the generally horizontal direction as guided by two pins 108, as further described below. There may be more than one group of extrusion tools 110 and pins 108 within extrusion tool assembly 120.

Extrusion tool assembly 120 is mounted to base plate 102 by screws 111 inside of sleeves 112 which allow tool assembly 120 to move up and down relative to base plate 102. Gas springs 109 are provided from top shoe 61 to push down extrusion tool assembly 120 so that it keeps applying pressure on extrusion edges 115 against material 90 during the extrusion operation. There are two guiding blocks 103 and 104 mounted to base plate 102 to slidably secure tool assembly 120.

Bottom die 101b has a flat surface to support material 90 thereon.

The operation of extrusion station 100 is now described referring to FIGS. 7A–8C. FIG. 7A shows extrusion station 100 when die 101 is in an open position at the beginning of the press cycle. Gas springs 109 urge extrusion tool assembly 120 down to create a gap 130 between base 102 and tool assembly 120. The extrusion tools 110 are in position ready to extrude material 90. The extrusion tool has one or more extrusion edges 115 and a flat edge 116 in front of each extrusion edge 115. Additional details regarding the extrusion tool are provided further below.

Figure 8A:
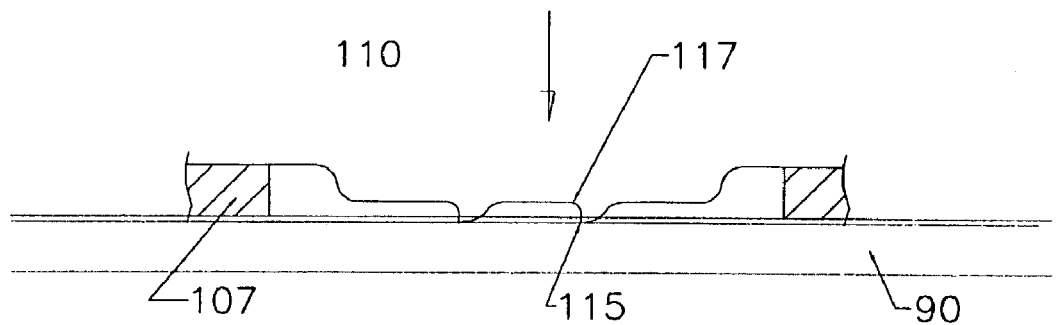
FIGS. 8A, 8B and 8C are schematic partial views of an extrusion tool and a plate material showing steps of extrusion.

When top die 101a moves down, extrusion edges 115 touch the surface of plate material 90 (FIG. 8A). Due to the pressure imparted by gas springs 109 onto extrusion tool assembly 120, extrusion edges 115 push into the surface of plate material 90. As top die 101a continues to move down, pins 108 inside of tool assembly 120 move down together with base 102 and apply a force on lower inclined walls 103a of oblong holes 113 on the extrusion tools 110, causing extrusion edges 115 to advance into plate material 90 at an angle corresponding to the angle of inclined wall 103a. The oblong holes 113 on extrusion tools 110 have different orientations to move extrusion tools 110 in different directions, i.e., left or right in FIGS. 7A and 7B.

When top die 101a moves further down, bottom cover 107 of extrusion tool assembly 120 contacts with the surface of plate material 90 and rests thereon. This prevents extrusion tools 110 from moving further downward, and thus determines the end of inclined section of groove 40. As pins 108 move further downward with base 102, extrusion tool 110 cannot go downward any further and they start to slide in generally horizontal directions to form flat section of groove 40. Thus, the depth of the groove can be precisely controlled.

Figure 8B:
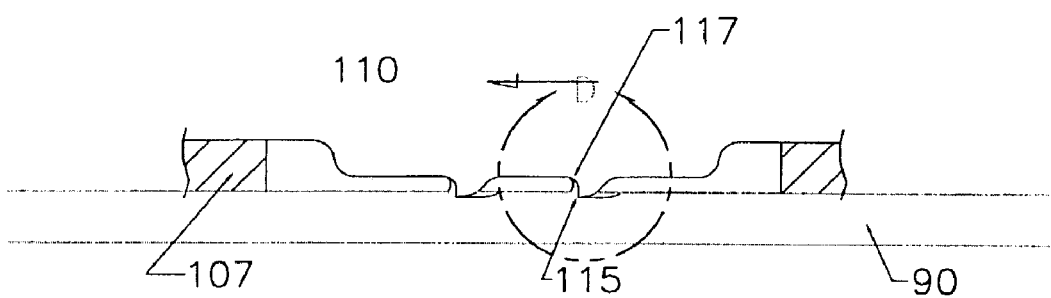
Figure 8C:

As the extrusion edges 115 advance at an angle and then in a horizontal direction, portions of plate material 90 are pushed by extrusion edges 115. The speed of each extrusion tool 110 is adjusted so that extrusion edges 115 move slow enough such that the portions of plate material 90 pushed by extrusion edges 115 can follow the shape of extrusion edges 115 and curved edges 117 (FIGS. 8B and 8C). Thus, it is easy to control the shape of protrusions 42. This is advantageous over certain conventional apparatus in which cutting tools are moved relatively quickly to cut or score a surface portion of the plate material so that burrs are curled away from cutting tools and form a shape that differs from that of the cutting edges.

In extrusion station 100, it is preferable that extrusion tools 110 are moved at the speed of about 30 mm/s to 70 mm/s relative to first surface 28 of body 26.

When the protrusion tools 110 reach at the bottom of the press stroke, pins 108 reach bottom of oblong holes 113

(FIG. 7B). This ends the formation of the flat section of grooves 40 and protrusions 42.

When upper die 101a moves up, gas springs 111 remain keeping tool assembly 120 pressed on material 90 but pins 108 move up within oblong holes 113 of extrusion tools 110 together with the upper die 101a. When pins 108 move upward, they move along upper inclined wall 113b. This movement of pins 108 causes positive retraction of extraction tools 110, i.e., each extraction edge 115 moves first away from its corresponding protrusion in a generally horizontal direction and then moves upward at an angle to retract into housing 106. Thus, the upward movement of die base 102 does not damage protrusions 42 or extrusion edges 115.

Each extraction tool 110 is retracted to its original position when the top die 101a reaches the top dead centre of the press.

At the end of the press cycle, extrusion tools 110 have created several groups of retention members 32 arranged in columns on the surface of plate material 90. When the die 101 opens, plate material 90 is fed to start a new cycle for a new plate or a new location of the same plate.

Figure 9:
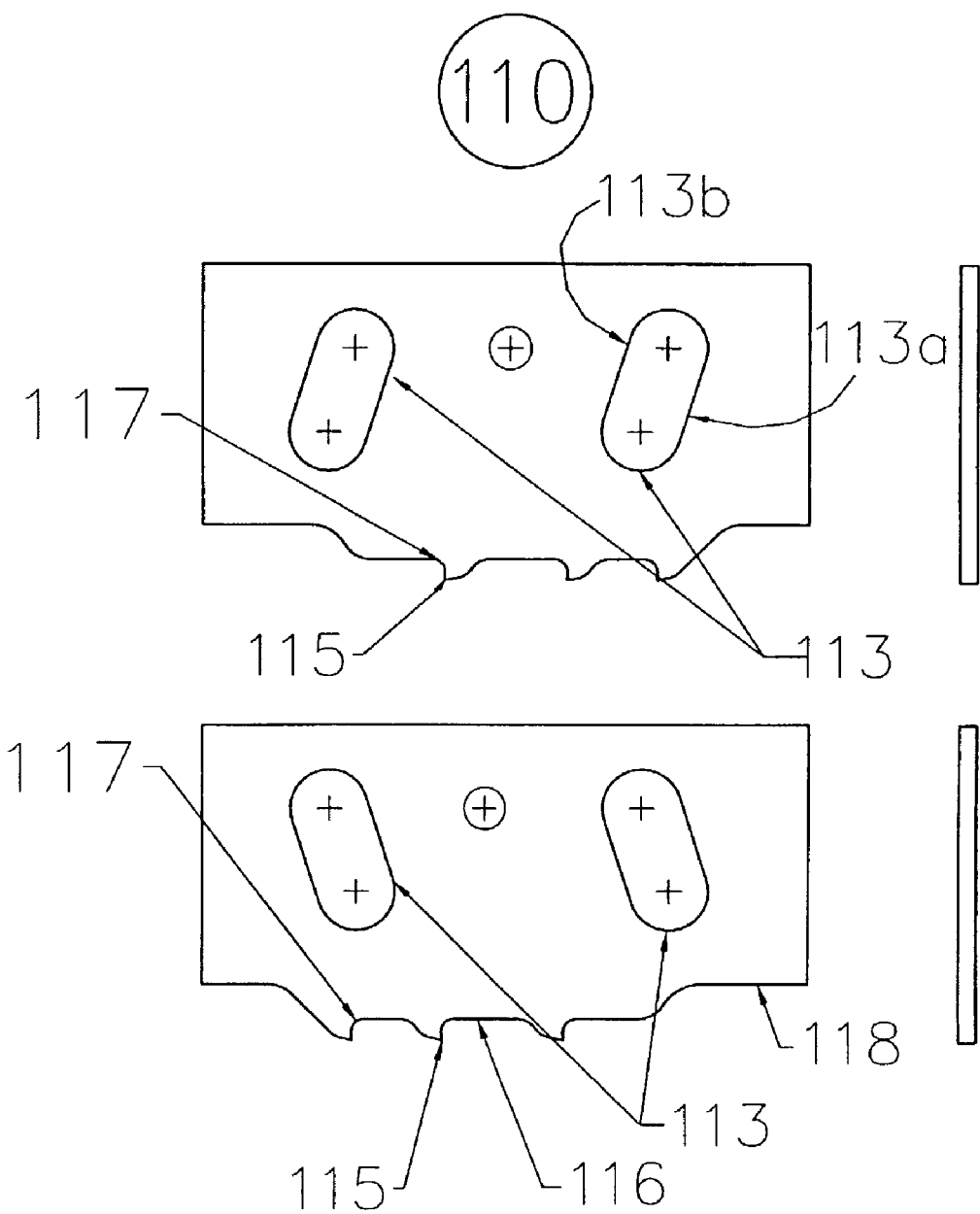
FIG. 9 is a schematic diagram of side and front views of extrusion tools.

FIG. 9 shows details of two exemplary extrusion tools 110. On extrusion tools 110 there are two oblong holes 113 within which two pins 108 of the extrusion apparatus 100 (shown in FIGS. 7A and 7B) are movable at an angle to a vertical line along the walls of oblong holes 113. Oblong holes 113 have lower inclined walls 113a and upper inclined walls 113b. It is desirable to use two or more oblong holes 113 and pins 108 for controlling the movement of each extrusion tool 110.

Each extrusion tool 110 has a thickness that corresponds to the width of the groove 40. Extrusion tool 110 has one or more extrusion edges 115 and a flat edge 116 in front of each extrusion edge 115. Extrusion tool 110 also has a shoulder 118 at each side. The number of extrusion edges 115 on a specific extrusion tool 110 depends on how many retention members should be formed in a group by the specific extrusion tool. Different extrusion tools 110 may have different numbers of extrusion edges 115 depending on the location of the particular extrusion tools within the tool housing 106.

Extrusion edge 115 and flat edge 116 are connected with a curved wall 117. The shape of the extrusion edge 115 and the curved wall 117 determines the shape of extruded protrusion 42. The plate material is pushed by the extrusion edge 115. The pushed material moves forward and upward along the curved wall 117. Thus, the shape of the curved wall 117 defines the shape of the protrusion 42. Formation of the curved distal end of the protrusion 42 is described above referring to FIGS. 7A–8C.

Plate material 90 is advanced while upper die 101a is up. If impressions are desired, the section of the backing plate having retention members 32 formed by extrusion station 100 is then fed into impression station 150.

Figure 10:
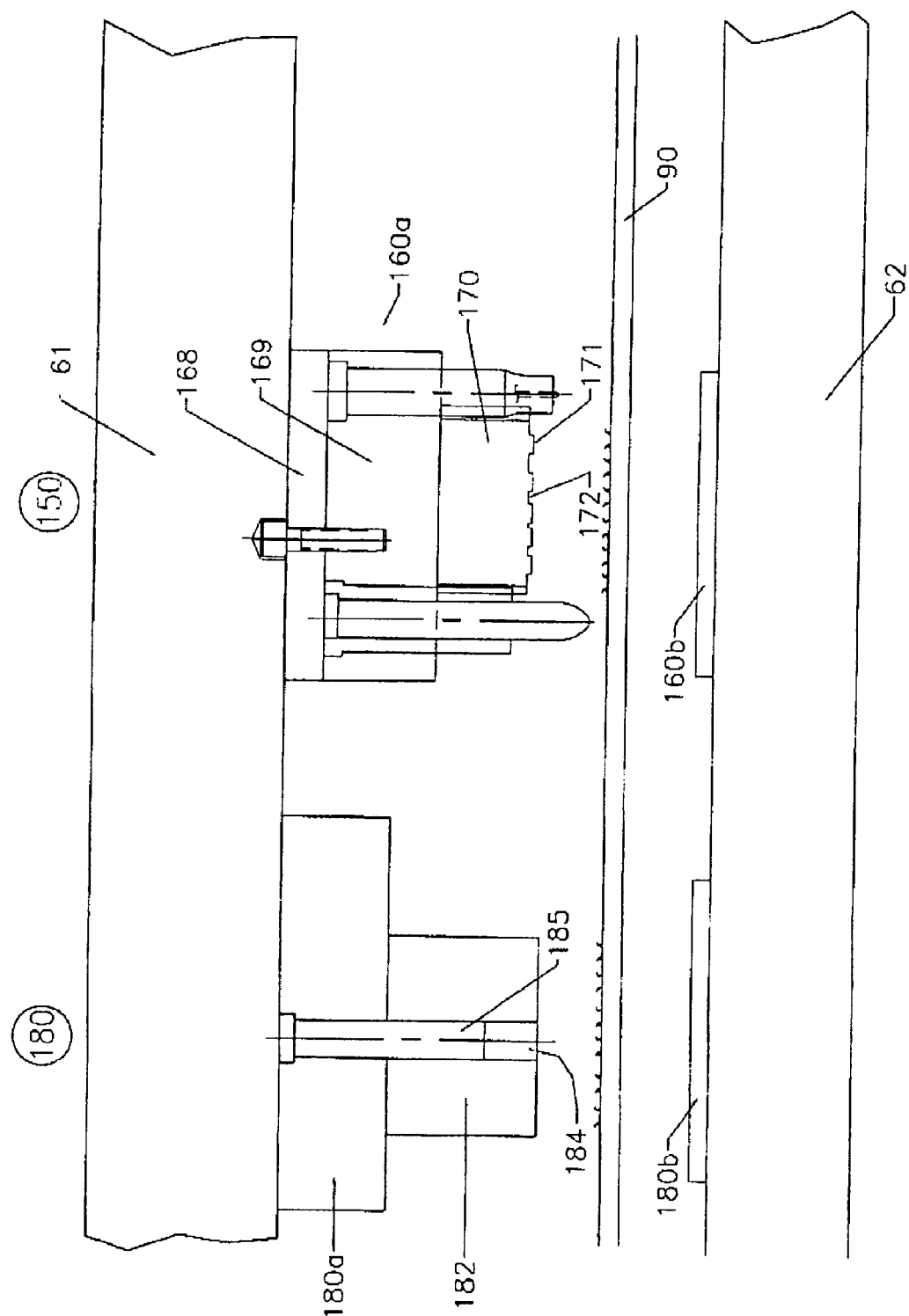
FIG. 10 is a schematic cross-sectional side view of an impression station and a blanking station.

As shown in FIG. 10, impression apparatus 150 has a press die having an upper die 160a and a bottom die 160b. Upper die 160a is mounted to top die shoe 61 and supports an impression block 170 by means of block holder 169 and back up plate 168. On the bottom surface of impression block 170, impression beads 171 and recessions 172 are provided. Impression beads are provided where impressions 52 are to be formed, e.g., typically over one or more grooves 40 of retention members 32. Recessions 172 are provided to locations where protrusions 42 are formed. Each recession 172 has a depth greater than the height of protrusion 42. Lower die 160b is mounted on bottom die shoe 62. Lower die 160b has a flat top surface to support plate material 90 from underneath during the impression forming operation.

In operation, when upper die 160a moves down, impression beads 171 are pressed onto the surface of plate material 90 to form impressions 52 while recessions 172 receive protrusions 42 to protect them during formation. As lower die 160b has a flat top surface, this impression forming operation also flattens the lower surface of plate material 90.

The section of plate material 90 on which retention members 32 and impressions 52 are formed is fed into blanking station 180. FIG. 10 also shows blanking section 180 which has a press die having an upper die 180a and a bottom die 180b. Upper die 180a is mounted to top die shoe 61 and supports main punch 182 and punch holder 184. Punch holder 184 has hole 185 within which punch 182 moved up and down. Punch 182 has a shape corresponding to the profile of desired backing plate 24. Lower die 180b is mounted on bottom die shoe 62. Lower die 180b has a flat top surface to support plate material 90 from underneath during the blanking operation.

In operation, when upper die 180a moves down, main punch 182 is brought onto the surface of plate material 90 to blank backing plate 24 from plate material 90. The blanking station 180 may use conventional blanking or fine blanking.

It is to be understood that what has been described is embodiments to the invention. The invention nonetheless is susceptible to certain changes and alternative embodiments fully comprehended by the spirit of the invention as described above, and the scope of the claims set out below.

What is claimed is:

1. A backing plate for a friction assembly, the backing plate comprising:

a body having a first surface for receiving a friction material thereon and a second surface opposed to the first surface and defining a thickness therebetween; and one or more retention members defined on the first surface, each retention member having:

a protrusion extending outwardly away from the first surface of the body, the protrusion having a proximal end connected to the first surface and a free distal end, and the protrusion having a generally constant width from the proximal end to the distal end; and a groove associated with the protrusion, defined in the first surface of the body, the groove extending from a position on the first surface of the body to the proximal end of the protrusion, the groove having a bottom wall having an inclined section extending at an angle relative to the first surface and a generally flat section generally parallel to the first surface, and the groove further having a width that generally corresponds to the width of the protrusion, wherein the protrusion has a thickness that is substantially larger at the proximal end than at the free distal end and the thickness of the protrusion adjacent the proximal end is larger than the depth of the generally flat section of the groove, and the free distal end of the protrusion is curved away from the associated groove to define a longer convex wall and a shorter concave wall between the proximal end and the free distal end so that the protrusion presents a distorted semi-triangular cross-section with the free distal end curved above the distorted semi-triangular cross-section.

2. The backing plate as claimed in claim 1, wherein:
the body has a length along which a major friction force is intended to be applied when the friction assembly is in use, and a width generally perpendicular to the length; and
each retention member is provided on the first surface such that the groove extends generally along the width of the body.

3. The backing plate as claimed in claim 2, wherein retention members are aligned in one or more groups over the first surface along the width of the body.

4. The backing plate as claimed in claim 3 having multiple groups of retention members, wherein the groups of retention members are oriented in different directions.

5. The backing plate as claimed in claim 3 having multiple groups of retention members aligned in columns, wherein one group of retention members extends in a predetermined direction and retention members in a neighbouring group extend in the opposite direction.

6. The backing plate as claimed in claim 1, wherein the protrusion is integrally formed on the first surface.

7. The backing plate as claimed in claim 6, wherein the protrusion is formed by extruding a portion of the body that corresponds to the associated groove.

8. A friction assembly comprising:
the backing plate of claim 1; and
a friction material mounted on the first surface of the backing plate such that the friction material is engaged with the at least one retention member.

9. The backing plate as claimed in claim 1, wherein the protrusion has a thickness that diminishes from the proximal end towards the free distal end.

10. The backing plate as claimed in claim 1, wherein the inclined section of each groove forms an angle in the range of from about 10 to about 20 degrees relative to the first surface of the backing plate.

11. The backing plate as claimed in claim 1, further comprising one or more impressions formed over one or more grooves of one or more retention members.

12. The backing plate as claimed in claim 1, wherein the second surface of the body is generally flat.

13. The backing plate as claimed in claim 1, wherein the thickness of the body between the first and second surfaces is generally uniform.

14. The backing plate as claimed in claim 1, wherein the height of the protrusions is in the range of about 0.03–0.1 inches.

15. The backing plate as claimed in claim 1, wherein the width of the protrusions is in the range of about 0.08–0.1 inches.

16. The backing plate as claimed in claim 1, wherein the depth of the grooves is in the range of about 0.01–0.03 inches.

17. The backing plate as claimed in claim 1, wherein the length of the grooves is in the range of about 0.12–0.22 inches.

18. The backing plate as claimed in claim 1, wherein:
the body has a length along which a major friction force is intended to be applied when the friction assembly is in use, and a width generally perpendicular to the length;
each retention member is provided on the first surface such that the groove extends generally along the width of the body, and multiple groups of retention members are aligned in columns, wherein one group of retention members extends in a predetermined direction and retention members in a neighbouring group extend in the opposite direction; and
the protrusion is integrally formed on the first surface such that the protrusion has a height in the range of about 0.03–0.1 inches and a width in the range of about 0.08–0.1 inches; and the groove has a depth in the range of about 0.01–0.03 inches and a length in the range of about 0.12–0.22 inches.

19. A friction assembly comprising:
a backing plate including:
a body with a first surface for receiving a friction material thereon and a second surface opposite to the first surface and defining a thickness therebetween; and
one or more retention members defined on the first surface, each retention member having:
a protrusion extending outwardly away from the first surface of the body, the protrusion having a proximal end adjacent to the first surface and a free distal end, and the protrusion having a generally constant width from the proximal end to the distal end; and
a groove associated with the protrusion and defined in the first surface of the body, the groove extending from a position on the first surface of the body to the proximal end of the protrusion, the groove having a bottom wall having an inclined section extending at an angle relative to the first surface and a flat section generally parallel to the first surface, said groove further having a width that generally corresponds to the width of the protrusion,
wherein the protrusion has a thickness that is substantially larger at the proximal end than at the free distal end and the thickness of the protrusion adjacent the proximal end is larger than the depth of the generally flat section of the groove, and the free distal end of the protrusion is curved away from the associated groove to define a longer convex wall and a shorter concave wall between the proximal end and the free distal end such that the protrusion presents a distorted semi-triangular cross-section with the free distal end curved above the distorted semi-triangular cross-section; and
a friction material mounted on the first surface of the backing plate such that the friction material is engaged with the at least one retention member.

20. The friction assembly as claimed in claim 19, wherein:
the body has a length along which a major friction force is intended to be applied when the friction assembly is in use, and a width generally perpendicular to the length; and
each retention member is provided on the first surface such that the groove extends generally along the width of the body.

21. The friction assembly as claimed in claim 20, wherein retention members are aligned in one or mare groups over the first surface along the width of the body.

22. The friction assembly as claimed in claim 21, wherein the backing plate has multiple groups of retention members, wherein the groups of retention members are oriented in different directions.

23. The friction assembly as claimed in claim 21, wherein the backing plate has multiple groups of retention members aligned in columns, wherein one group of retention members extends in a predetermined direction and retention members in a neighbouring group extend in the opposite direction.

24. The friction assembly as claimed in claim 19, wherein the protrusion is integrally formed on the first surface.

25. The friction assembly as claimed in claim 24, wherein the protrusion is formed by extruding a portion of the body that corresponds to the associated groove.

26. The friction assembly as claimed in claim 19, wherein the protrusion has a thickness that diminishes from the proximal end towards the free distal end.

27. The friction assembly as claimed in claim 19, wherein the inclined section of each groove forms an angle in the range of from about 10 to about 20 degrees relative to the first surface of the backing plate.

28. The friction assembly as claimed in claim 19, further comprising one or more impressions formed over one or more grooves of one or more retention members.

29. The friction assembly as claimed in claim 19, wherein the second surface of the body is generally flat.

30. The friction assembly as claimed in claim 19, wherein the thickness of the body between the first and second surfaces is generally uniform.

31. The friction assembly as claimed in claim 19, wherein the height of the protrusions is in die range of about 0.03–0.1 inches.

32. The friction assembly as claimed in claim 19, wherein the width of the protrusions is in the range of about 0.08–0.1 inches.

33. The friction assembly as claimed in claim 19, wherein the depth of the grooves is in the range of about 0.01–0.03 inches.

34. The friction assembly as claimed in claim 19, wherein the length of the grooves is in the range of about 0.12–0.22 inches.

* * * * *

UNITED STATES PATENT AND TRADEMARK OFFICE
CERTIFICATE OF CORRECTION

| | | |
|---|---|---|
| PATENT NO. | : 7,222,701 B2 | Page 1 of 1 |
| APPLICATION NO. | : 10/453179 | |
| DATED | : May 29, 2007 | |
| INVENTOR(S) | : Pham | |

It is certified that error appears in the above-identified patent and that said Letters Patent is hereby corrected as shown below:

Column 12, line 54 (claim 21): "mare" should read --more--.

Column 14, line 5 (claim 31): "die" should read --the--.

Signed and Sealed this

Twenty-fourth Day of July, 2007

JON W. DUDAS
*Director of the United States Patent and Trademark Office*